March 21, 1961  J. T. McNANEY  2,976,529
RADAR IDENTIFICATION SYSTEM
Filed Sept. 9, 1957  6 Sheets-Sheet 1

INVENTOR.
JOSEPH T. McNANEY
BY Egon W. Mueller
ATTORNEY

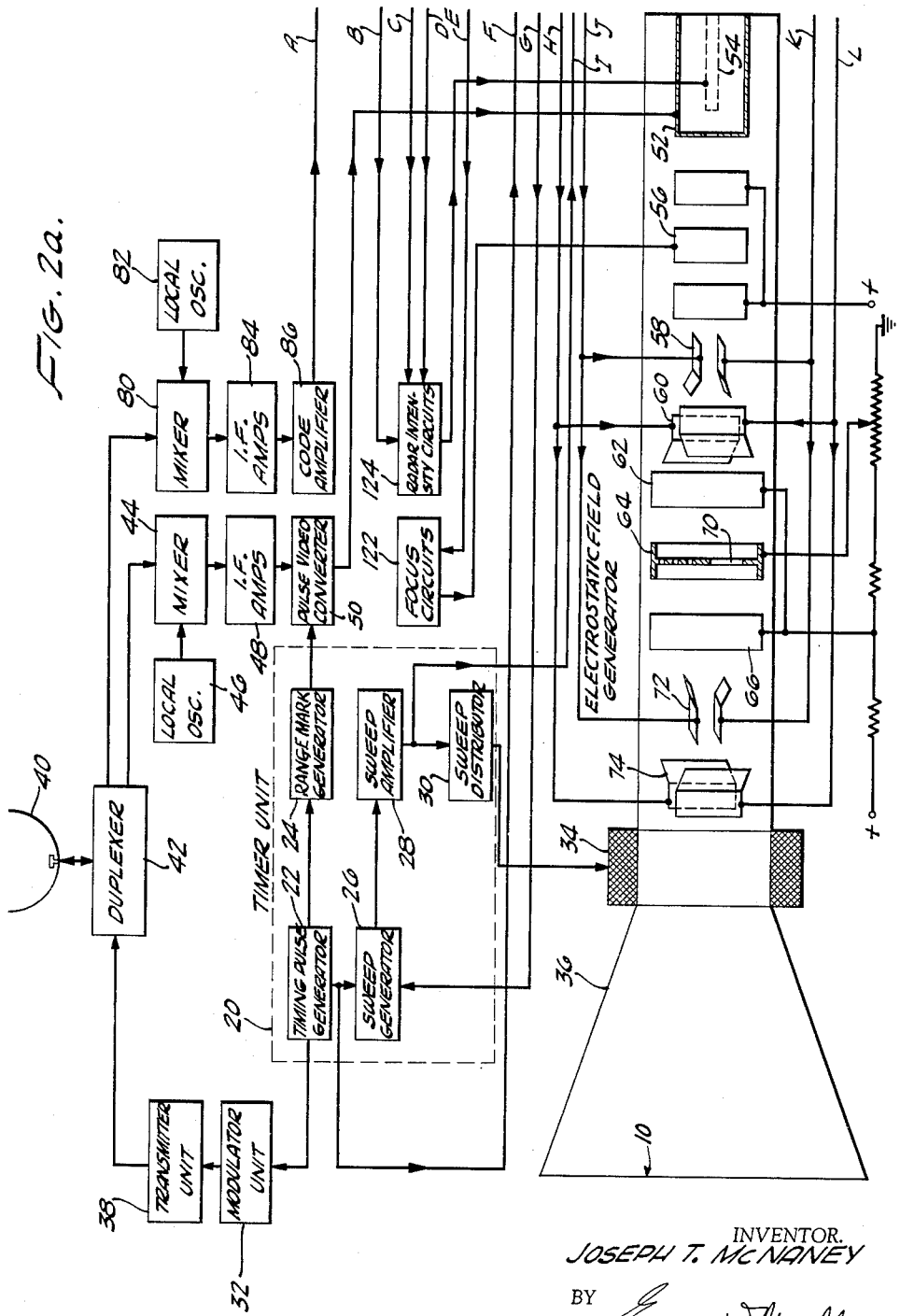

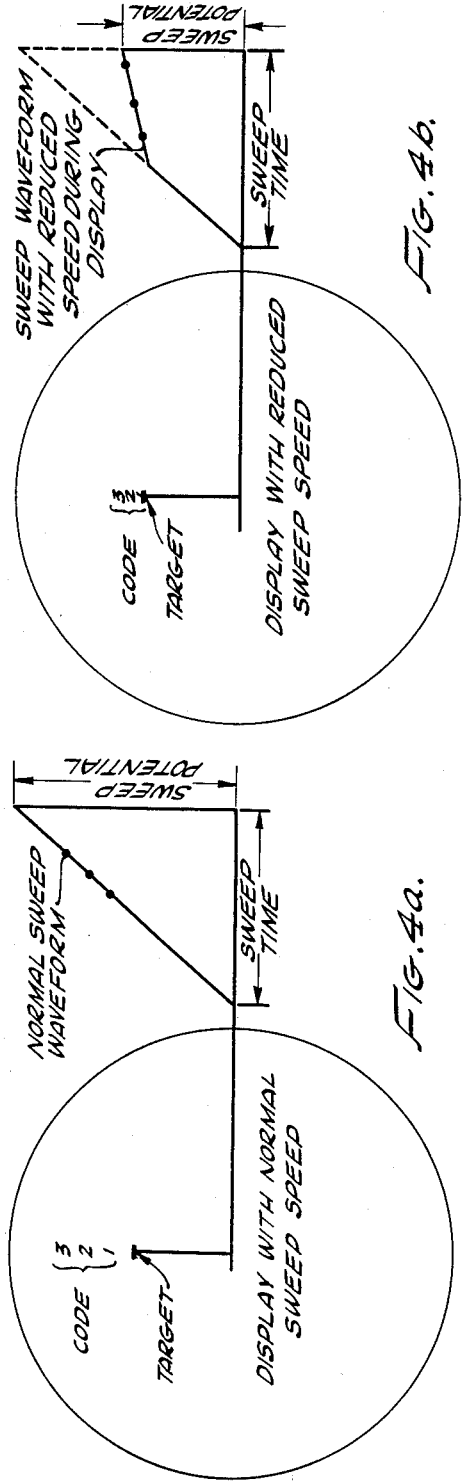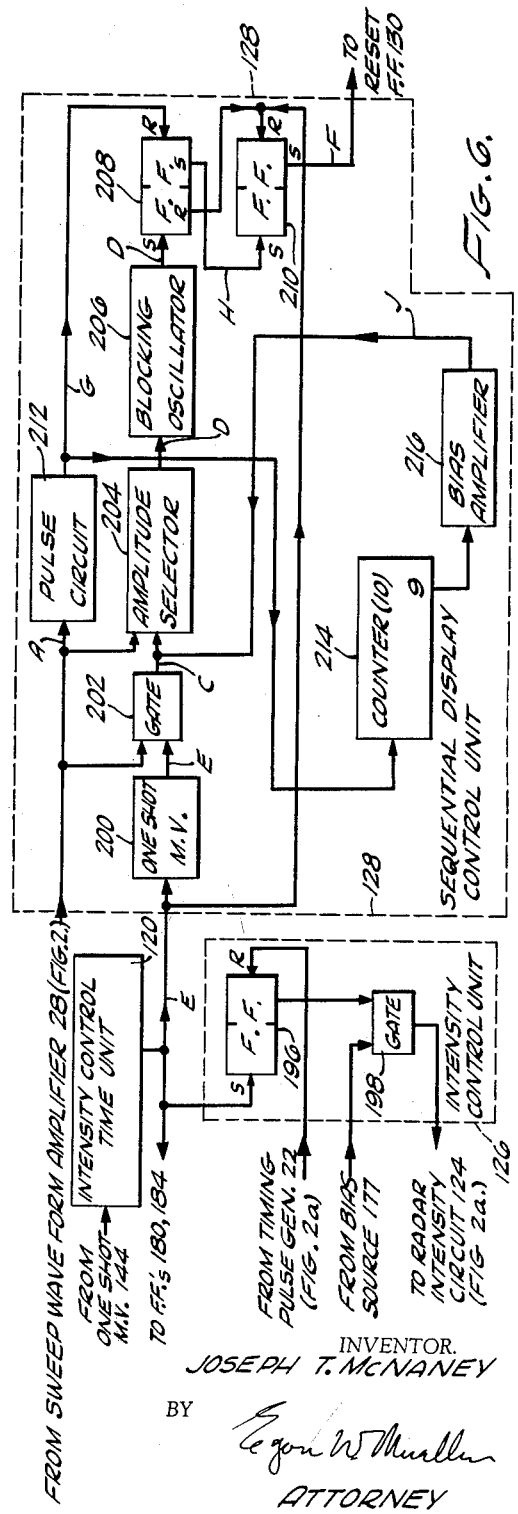

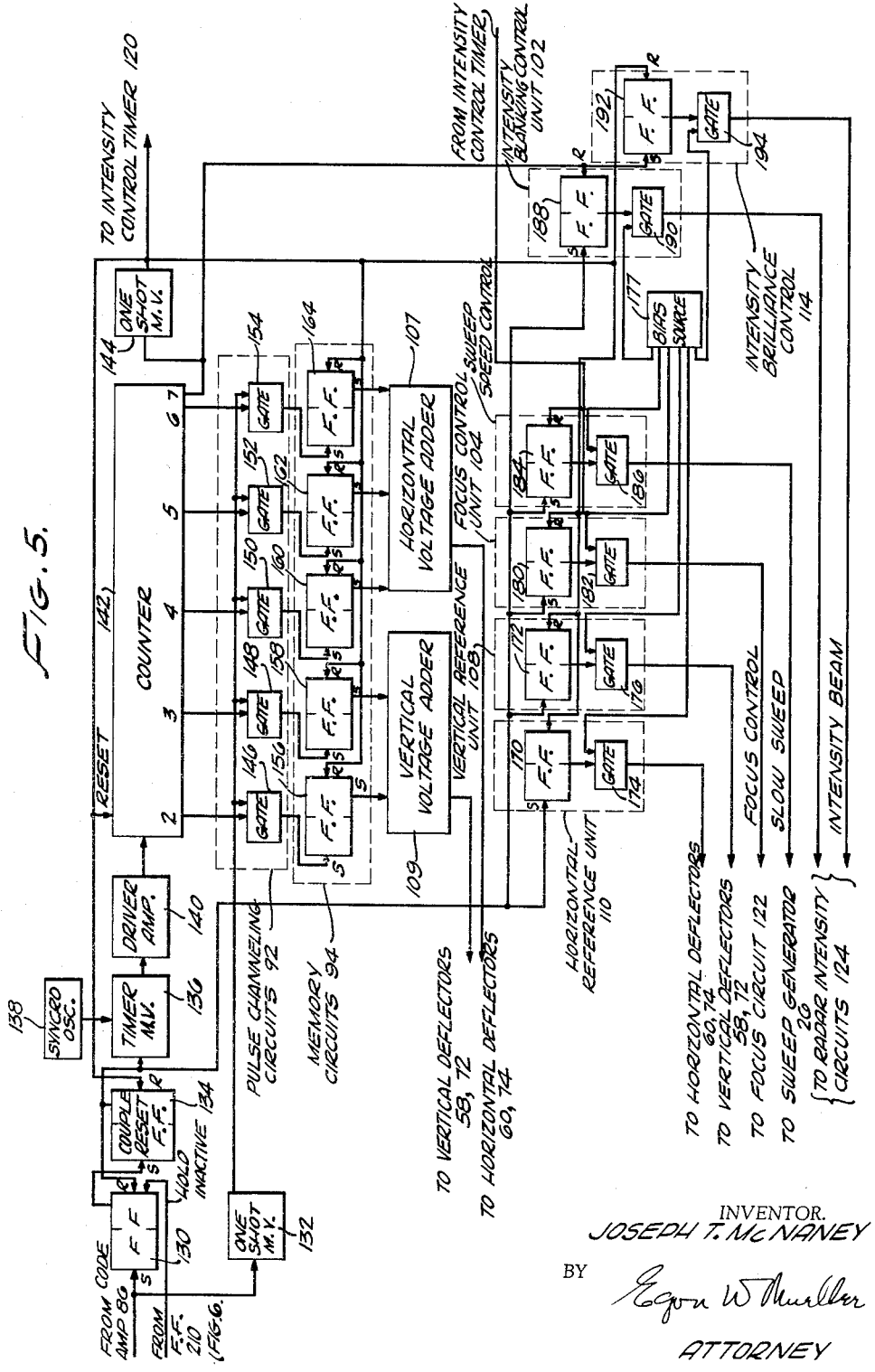

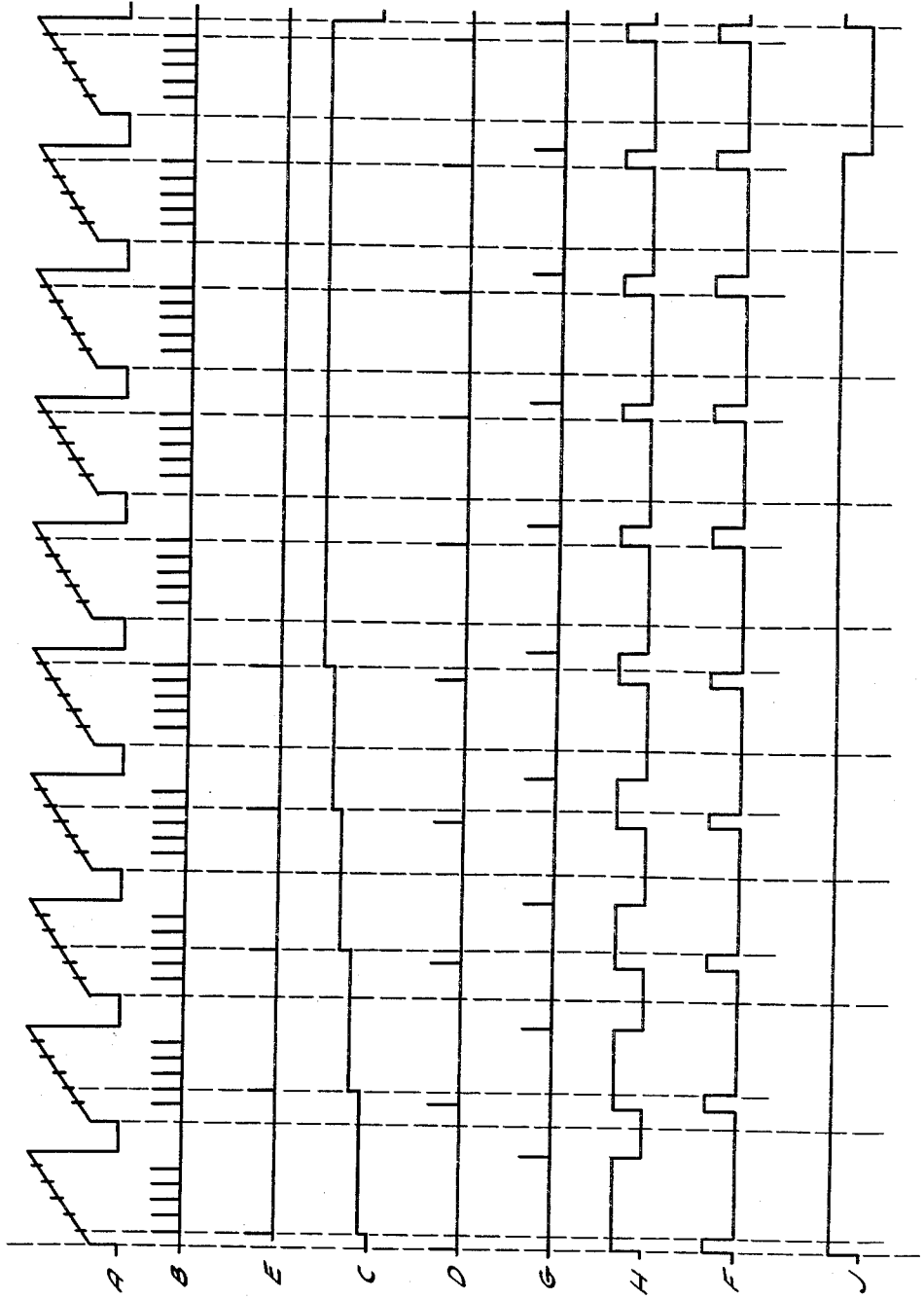

United States Patent Office 2,976,529
Patented Mar. 21, 1961

2,976,529

RADAR IDENTIFICATION SYSTEM

Joseph T. McNaney, La Mesa, Calif., assignor to General Dynamics Corporation, Rochester, N.Y., a corporation of Delaware Filed Sept. 9, 1957, Ser. No. 682,776

2 Claims. (Cl. 343—6.5)

This invention relates to radar identification systems and, more specifically, to an improvement in a method and means of radar identification and data display.

One of the present radar systems has an intensity-modulated, persistent, map-type radar display in which there are employed coded signals which are transmitted from a target in response to a query from the transmitter. These coded signals contain identification and other pertinent intelligence and are generally utilized in the form of a series of vari-spaced and/or vari-length pulses. These coded signals, which are received in response to interrogation by the radar station, are commonly presented for visual interpretation as a series of "blips," following the target echo upon the radar display. Alternate methods of utilization of the coded signals have been proposed and experimented with, in which decoding is automatic and the information derived is utilized to alter the cathode-ray tube display, i.e., color-target blips may be presented, thus distinguishing between classes of targets; target blips are suppressed, or "erased," from the display; decoded signal are converted mechanically into symbols and displayed as with mechanical counters.

An object of the present invention is to provide a novel method and means of radar identification and data display which provides a simultaneous visual presentation of target blips in association with characters derived from coded signals received from said target upon radar query.

Another object of the present invention is to provide a novel method and means of radar identification and data display in which information relating to a particular target is associated therewith and is readily discernible from other signals being displayed.

Yet another object of the present invention is the provision of a novel and compact radar identification and display system in which targets and the associated identifying data are displayed on the face of a single cathode-ray display tube.

Still another object of this invention is to provide a unique radar identification and data display system in which the intelligence derived by automatic decoding of signals is presented directly as symbols, numerals, and/or characters upon the radar display, whereby difficulties of discernment of code identification, which can lead to confusion and error, are avoided.

These and other objects of the present invention are achieved by employing for the purposes of radar identification and data presentation a cathode-ray tube of the type which includes an apertured mask which is interposed in the tube between the cathode and the screen. This apertured mask has character-shaped apertures. Means are provided whereby the electron beam may be deflected to pass through a desired one of these character-shaped apertures, thereby assuming the shape of the aperture. The tube of the type intended is found described and claimed in Patents Nos. 2,735,956 and 2,761,988 for Cathode-Ray Apparatus, which pattents are issued to this inventor. In the character-beam-shaped tube contemplated, in addition to the aperture-shaped mask having character-shaped apertures, it will have in the center a round aperture, through which the cathode-ray beam may pass. The purpose of the round aperture is to enable the presentation of data in the manner well known heretofore, namely, providing a brightness blip, which is positioned on the screen of the tube at a location identifiable with the location of the target providing the echo. Following the echo blip, there are a number of letters or characters which are obtained as a result of identification information transmitted from the target beam queried by the radar identification apparatus.

Thus, the method and means of the present invention comprises an arrangement whereby, in response to the transmission of a signal from the radar system, there is returned the usual echo from the target, and, in addition, identifying information consisting of, for example, a pulse code representative of such identification information. At the receiver there is present means whereby the usual radar presentation is first presented on the screen of the character-shaped beam tube, followed by the associated identification information. This associated identification information is obtained by circuits in the receiver which decode the received identification code by providing voltages for selecting the proper character-shaped apertures and then deflecting the shaped electron beam to the proper position adjacent the target blip with which the character display is to be associated.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figures 2a and 2b are functional block diagrams of an embodiment of the invention;

Figures 4A and 4B show sweep speed and display waveforms to assist in understanding this invention;

Figure 5 is a block schematic diagram of some of the apparatus required in a radar system in accordance with this invention;

Figure 6 is a block schematic diagram of the remaining apparatus required in a radar system in accordance with this invention; and Figure 7 is a wave shape diagram shown to assist in an understanding of the operation of the sequential display control unit.

Figures 1, 3:
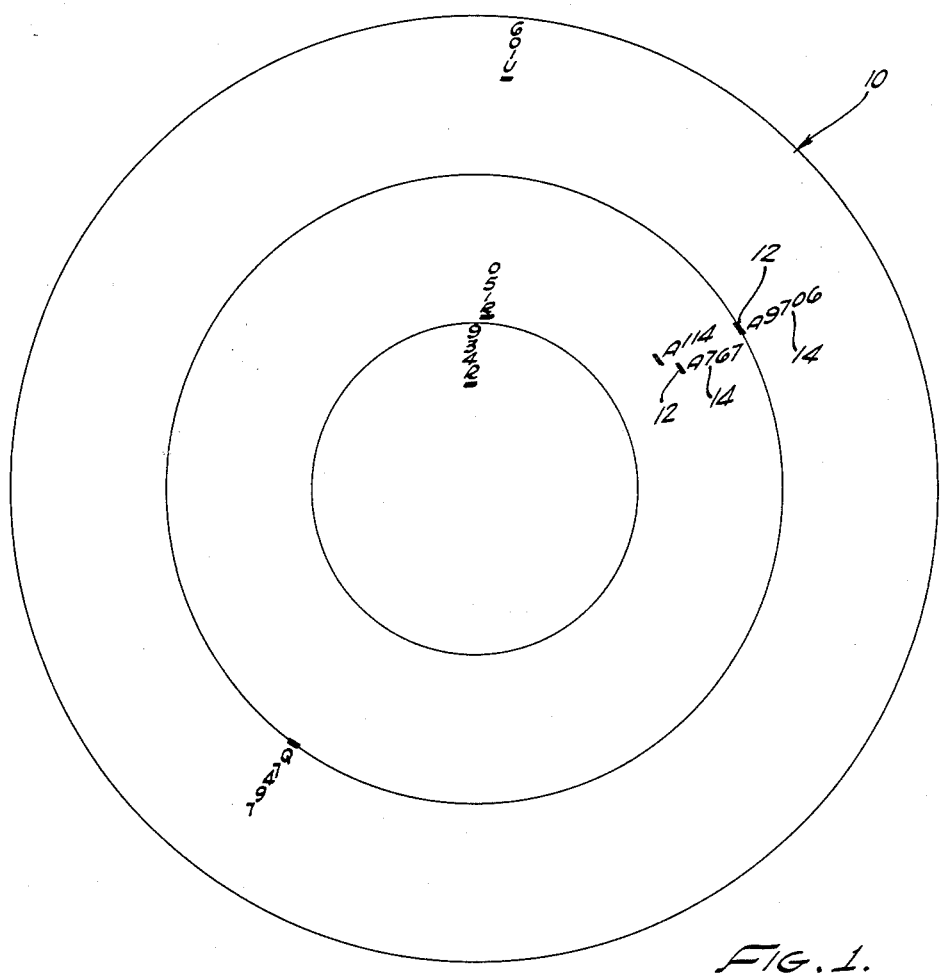
Figure 1 is a view of the presentation obtained on the face of a display tube by employing this invention.
Figure 3 represents an aperture plate employed in a shaped-beam tube in the invention.

Reference is now made to Figure 1, which illustrates the presentation seen on the face of the character-beam-shaped tube employed in accordance with this invention. The tube has the usual phosphor screen 10. Each light blip 12, corresponding to the echo from a target, is positioned on the tube at the location whereby the range and azimuth of the target are identifiable. Adjacent each target blip will be presented characters 14, which may consist of numbers, letters, symbols, or a combination, as desired. By way of illustration, it will be assumed that a target identifies itself by transmitting a code which has five numbers which identify the target.

Figure 2B:
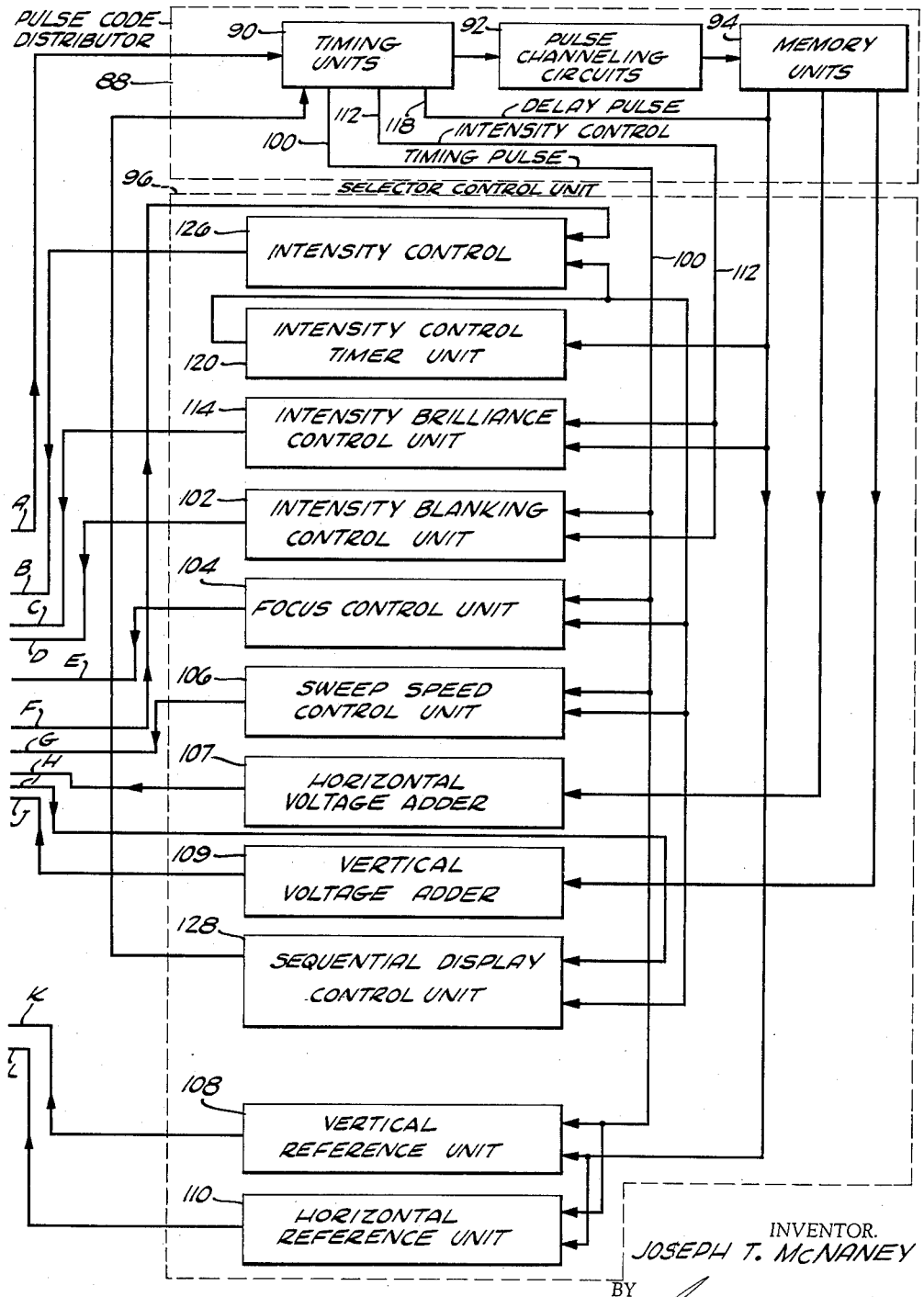

Figures 2a and 2b are functional block diagrams of an embodiment of the invention. This includes circuit elements which are well known and are commonly employed in radar systems, as well as other circuit elements which will be described in more detail subsequently herein, which co-operate with the known components to function in accordance with this invention. The receiver will include a timer unit 20, wherein there are the circuit elements which are directly concerned with the pulse-repetition cycle of the radar system, namely, the timing-pulse generator 22, the range-mark generator 24, the sweep generator 26, the sweep amplifier 28, and a sweep distributor 30. The techniques employed to produce the required stable timing pulses, range marks, and sweep voltages are well known in the radar art, and typical circuits are found described in volume 22 of "Cathode-Ray Display" of the Radiation Laboratory Series, chapter 13, page 449, for example. A suitable range-mark generator circuit is described and illustrated in chapter 2 of Principles of Radar, second edition, by the M.I.T. Radar School.

The timer unit 20 operates in a conventional manner in that it synchronizes the firing time of a modulator unit 32, with the triggering of the range mark and sweep generating units 24 and 26, respectively. Timing-pulse generator 22 provides the synchronizing pulses which are applied simultaneously to the above-mentioned circuits. Sweep distributor 30 provides proper voltage waveforms to the deflection coils 34 of the cathode-ray display device 36, hereafter referred to as the character-beam-shaped tube. These waveforms are such that a conventional P.P.I. (Plan Position Indicator) type of display is generated upon the screen 10 of the tube. As previously indicated, the character-beam-shaped tube 36 is similar to those devices described and shown in Patents No. 2,761,988 and 2,735,956. There are differences, however, in certain aspects of the construction and modes of operation, as will be hereinafter disclosed, whereby the tube is capable of both displaying the radar video signals as well as the identification symbols associated with the radar signal. This can be done either simultaneously or to the exclusion of either.

Modulator unit 32 controls a transmitter unit 38 by applying the suitable pulses whereby radio frequency energy is produced in short, powerful pulses in a definite shape, duration, and repetition rate. The principles and methods of the radar transmitter modulator operation are well known and will not be gone into here. The pulses generated by the transmitter unit 38 are coupled by a conventional wave guide or coaxial cable (not shown) to the antenna unit 40 through a duplexer or duplexing unit 42. Duplexing unit 42 is a conventional radar component which functions to prevent transmitted energy from entering the receiver during periods of such transmission and to prevent the received radar echo and coded pulse signals from entering the transmitter. In the practice of this invention, the duplexing unit 42 is a two-channel device, such that both the radar echo and coded pulse signals may be simultaneously introduced into separate receiver channels. An illustration of a suitable two-channel duplexer is shown in Microwave Duplexers, volume 14 of the Radiation Laboratory Series, page 348, Figure 8.19.

In operation of this system, it is required that in response to the transmission of a pulse of energy by the antenna 40, the target will not only reflect energy back, but will also identify itself by transmitting a pulse code which may be translated into information whereby the target is identified. Systems for performing this type of operation are known as the I.F.F. Systems (Identify Friend or Foe).

The output of the duplexer is applied to two separate channels, one of which will handle the pulse code signals and the other will handle the video signals. The video-signal channel includes a mixer 44 and associated therewith a local oscillator 46, whereby the output of the mixer may be heterodyned to an IF frequency, which is applied to an IF amplifier 48. The output of the IF amplifier 48, consisting of pulses, is then applied to a pulse-to-video converter 50. This pulse-to-video converter also receives range mark pulses from the range-mark generator 24. The output of the pulse-to-video converter 50 is applied to control the gating on and off of a cathode-ray beam in the cathode-ray tube 36. Deflection signals are provided from the sweep distributor 30 and are applied to the deflection means 34.

As thus far described, the system is conventional and will operate in well-known manner to provide a display on the face of the tube 36 comprising target-brightness pips. The output of the pulse-to-video converter 50 is applied to the control grid 52 of the cathode-ray tube, whereby it modulates the electron beam obtained from the cathode 54. An anode 56 serves the function of focusing the modulated electron beam to have a narrow circular cross-section. Vertical and horizontal electrostatic deflectors 58, 60 serve the function of directing the beam along the axis of the tube toward the screen 10. The electron beam passes unaffected through the electrostatic field generated by the rings 62, 64, 66. A beam-shaping aperture plate 70, which is mounted within the ring 64, has a relatively large, round hole in its center. The electron beam passes through this hole on its way to the screen. The aperture plate 70 will be described and shown subsequently herein. Briefly, however, it consists of a flat plate which is mounted within the ring 64 so that its surface is normal to the tube axis. It contains a plurality of shaped openings having the form of symbols, numerals, and characters. The purpose of the round hole in this matrix is to provide for uninterrupted passage of the electron beam during intervals between reception of pulse-code groups so that the tube may operate in the conventional manner to present a conventional display.

Following the rings 62, 64, 66, there are provided a pair of vertical deflection plates 72 and a pair of horizontal deflection plates 74. These serve to realign the electron beam along the tube axis during the intervals of reception and display of character-shaped beams, but do not influence the electron beam during the time that a radar video display is provided. In other words, if the electron beam passes through the round hole along the axis of the tube, deflectors 72 and 74 do not affect it. Thereafter, sweep deflection is provided by the deflection coils 34 in response to signals from the sweep distributor 30. Means for providing the required P.P.I. display are well known and described, for example, in volume 22 of the Radiation Laboratory Series, published by McGraw-Hill Book Company, entitled Cathode-Ray Tube Displays, section 13.7, page 447.

Radio-frequency pulse-coded signals are received at the antenna 40 from, for example, target aircraft properly equipped with automatic receiver transmitters by which coded signals are transmitted following receipt of a search radar pulse. The frequency of the coded signals differs from the interrogating radar frequency such that the coded signals are separable by the duplexer 42. The output of the duplexer is applied to a mixer 80, to which are applied oscillations from a local oscillator 82, in order to heterodyne the received signal to a frequency which may be handled by the succeeding IF amplifier 84. The output of the IF amplifier 84 is applied to a video code amplifier 86. The output of the code amplifier 86 is applied to a pulse-code distributor unit 88, which includes timing units represented by a rectangle 90, pulse-channeling circuits represented by a rectangle 92, and memory circuits represented by a rectangle 94.

The code employed by way of illustration in the present invention is a time-sequential code in which a numeral, symbol, or character is represented by five binary-code bits. This grouping of five bits will be hereafter designated as a "digit." Each digit is preceded by an "on-mark" pulse. This on-mark pulse may be one having a different amplitude than the amplitudes of the binary bits or may have a different width. However, it must be a pulse which is distinguishable from the pulses used for representing binary bits. This invention should not be construed as being limited to using five binary bits or any other specific type of code, but as will be readily apparent to those skilled in the art other variations and other codes may be employed without departing from the spirit of this invention. As previously stated, each digit comprises five bits. The first and second bits are employed to control or determine the potential applied to the vertical selection plates 58; the last three bits will determine the amplitude of the deflecting voltage applied to the horizontal deflecting plates 60.

As a result of the deflecting voltages derived from the five-bit digit, the electron beam is deflected from the central axis to one of a plurality of aperture shapes in the aperture plate 70. This will be more readily seen by referring to Figure 3, wherein there is shown an aperture plate 70. This plate has a plurality of apertures represented by the numerals 1 through 9 and letters A through X. A round hole 71 is located below the letters in the aperture plate, through which the electron beam may pass when no character-shaped aperture is selected.

The numbers in Figure 3, along the edges of the aperture plate identify the respective columns and rows of the character and numeral-shaped apertures. At the upper left-hand corner, the column and row designated as "00" defines a position at which there is no aperture. The beam in the tube is always directed at this location before any one of the apertures is selected. It should be appreciated that a selection of any one of the apertures can be made by the choice of any one of three voltages which are applied to the vertical deflectors and any one of seven voltages which are applied to the horizontal deflectors. The first two bits in the code digit which select the vertical deflection voltages will be known as the "$a$" and "$b$" bits, and the last three bits in the code digit which select the horizontal voltages will be known as the "$c$," "$d$," and "$e$" bits. It is well known that any one of four locations can be defined by the presence and absence of two bits of information ($a$ and $b$), and, similarly, the presence and absence of three bits of information ($c$, $d$, and $e$) can readily define any one of eight locations. The digital-to-analog conversion wherein the received $a$ and $b$ bits establish the vertical deflection potentials and the $c$, $d$, and $e$ bits establish the horizontal deflection potentials will be described subsequently.

The function of the pulse-code distributor 88 shown in Figure 2b is to transform the pulse-coded time sequential data applied to its input into correlative time-coincident data which is applied to a selector control unit 96. The selector control unit 96 transforms the time-coincident code information into two unidirectional potentials which are applied to the vertical and horizontal deflectors for the purpose of directing the electron beam at one of the shaped apertures in order that it may be given the desired shape. These unidirectional voltages are also applied to the vertical and horizontal repositioning deflectors 72, 74 for the purpose of redeflecting the electron beam into its initial axial trajectory.

The potentials of rings 62, 64, and 66 are arranged in such a manner that an electrostatic field is produced in which theoretically equally potential lines, representing field strength as seen when an electrostaic field is viewed in cross section, form a "lens" configuration. The electron beam enters the selectors 58, 60 at the same potential as it entered the repositioning selectors 72, 74 by virtue of the potentials applied to the rings 62, 64, 66. In an extended electrostatic field, such as is generated in this tube, the trajectory of each electron entering the field, at the axial center of the "lens" and at an angle incident to the lens axis, is a curved path. Since the electrons are concentrated into a very narrow beam, the beam follows a curved path such that after passing through the selected character-shaped opening of the aperture plate 70, the beam continues to follow its curved trajectory, which thereafter approaches the common axis of the tube and the electrostatic lens. Thus, thereafter, the repositioning plates 72, 74 redeflect the beam into the initial axial trajectory. The deflection coils 34 continue to direct the beam in the prescribed sweep pattern and, at the proper instant, a visual image of the selected character or number appears superimposed upon the radar display.

Upon receipt of an "on-mark" pulse and in the absence of a disabling potential, as will be subsequently described, the timing unit 90 generates a pulse voltage which is simultaneously applied by means of the line 100 to a number of different circuits contained within the selector control unit 96. These are respectively designated as an intensity-blanking control unit 102, a focus-control unit 104, a sweep-speed control unit 106, a vertical-reference unit 108, and a horizontal-reference unit 110. Thereafter, the on-mark pulse is followed by the digit in the form of a time-sequential pulse code group which is converted into a time-coincident code and is stored in the memory units or circuit 94. A voltage pulse is thereafter generated by timing unit 90 in a manner to be described, and is applied over a line 112 simultaneously to an intensity-brilliance-control unit 114 and the intensity-blanking-control unit 102. Timing unit 90 also generates a delay pulse which is applied over a line 118 to the memory unit 94, to an intensity-control timer unit 120, and to the intensity-brilliance-control unit 114.

In response to receiving the timing pulse along line 100, vertical reference unit 108 and horizontal reference unit 110, developed in response thereto, reference voltages which are respectively applied to one of the vertical and horizontal deflectors of the both sets of deflectors 58, 72, and 60, 74. The purpose is to deflect the electron beam to the blank position in the upper left-hand corner of the aperture plate (Figure 3) previously designated as the 0, 0 row and column position. This beam position serves as a reference position from which the beam moves when a numeral or character is to be selected for display. Furthermore, application of these reference voltages to the repositioning deflectors 72, 74 serves to reference the electrostatic repositioning field to the trajectory of the electron beam, and thus provides a means of compensating for the difference in position of different characters in the aperture mask when the beam is being realigned to its initial axial trajectory.

Upon the application of a delay pulse to the vertical and horizontal reference units over line 118 from the timing unit 90 (which occurs after an aperture selection has been made), these units are restored to their condition prior to receiving the timing pulse. Thus, the vertical and horizontal reference units apply the vertical and horizontal reference voltages from the time an on-mark pulse is received until after the following digit it precedes has been processed.

During the time of the processing and display of a series of digits upon the fluorescent screen of the tube, the sweep speed of the electron beam is reduced as a result of the operation of the output of the sweep-speed control unit 106 upon the sweep generator 26. The sweep-speed control unit 106, in response to receiving an on-mark pulse from the timing unit 90, applies a unidirectional voltage to the sweep generator 26 such that the slope of the sweep voltage waveform is changed in a manner to provide a reduction of the electron beam's sweep-speed to a suitable rate. This is done in order to insure that the identifying numerals or characters are close, or proximal, to a target blip. Figure 4A shows a normal sweep waveform and associated there with the type of display obtained with the normal sweep speed. Figure 4B shows the sweep waveform with reduced speed and the type of display obtained on the face of the tube as a result. It will therefore be readily appreciated that by reducing the sweep speed the characters which are employed to identify a target blip are in proximity therewith.

After display of a total of five symbols, numerals, or characters, the sweep-speed control unit 106 is deactivated by application thereto of an output from the intensity control timer unit 120. As a result, the sweep voltage waveform produced by the sweep generator 26 is restored to its normal shape.

In order to insure that an electron beam properly floods the entire area of a character-shaped aperture so that it may assume the shape of that aperture, provision is made for defocusing the electron beam during such time. This function is carried out by the focus-control unit 104, which in response to the timing pulse output applies a voltage to the focus circuit 122 of the system, whereby the potential normally applied from the focus circuit to the focusing ring 56 is altered to defocus the beam. It should be noted that by "defocusing" is meant the circular cross-section of the electron beam is increased. The delayed output of the intensity-control timer unit is also applied to the focus control unit after the five characters or numbers have been displayed to inactivate the focus-control unit 104, whereby the focus circuit 122 is able to apply the proper potential to the ring 56 to focus the beam again. It can thus be again employed for display of radar video information.

Some time must elapse from the time of receiving of the time-sequential code signals until they can be converted into the time-coincident code data. It is desirable to blank out the beam during this time. This function is carried out by applying the timing pulse from the timing unit 90 to the intensity-blanking control unit 102. The output of the intensity-blanking control unit is applied to the radar-intensity circuit 124. This circuit usually is employed in a radar system to establish the intensity of the electron beam. In response to the unidirectional voltage applied to the radar-intensity circuit from the intensity-blanking control unit, it applies a blanking voltage to the cathode 54. The intensity-control pulse is provided by the output of the timing unit at such time as the required data conversion has occurred. This is applied to deactivate the intensity-blanking control unit, whereupon the cathode-ray beam is turned on again.

The intensity-control pulse is also applied to the intensity-brilliance-control unit 114. Its output is applied to the radar-intensity circuit 124 for the purpose of having the opposite effect, namely, intensifying the brilliance of the beam derived from the cathode 54 during the time the selected digits or characters are displayed. The intensity-brilliance-control unit 114 is deactivated upon receiving a delay pulse from the timing unit at the termination of the display. Thereafter, the radar-intensity circuit restores the cathode-ray beam to its normal intensity.

It should be noted that for each numeral or character of a code group which is being displayed, the above-described processes are repeated. These are (1) blanking the electron beam during the period of time that a five-bit pulse code is being converted into time-coincident data and stored at memory circuit 94, (2) unblanking the electron beam and increasing its intensity above normal during the period of time that an aperture is being flooded, or illuminated, and (3) returning the beam intensity to its initial condition thereafter for display of radar data.

Because the electron-beam sweep rate is reduced during the period of time of a pulse-code conversion, storage, and display of a complete code group, consisting of five numerals or characters, the sweep may be distorted to such an extent that subsequent restoration may not occur sufficiently rapidly to enable the display of accurate radar data. This invention provides means whereby the display of radar data is prevented during the remainder of the sweep period, following the display of a complete code group.

The intensity-control timer unit 120 includes a linear counter which produces a single unidirectional output pulse for each series of five input pulses which has been applied thereto. These input pulses are five delay pulses received from the timing unit 90 over the line 118 (Figure 2B). Upon having received five delay pulses, the intensity-control timer unit applies its output to a number of circuits including the intensity-control circuit 126. In response to the unidirectional input pulse, the intensity control circuit 126 generates and applies a potential to the radar-intensity circuit 124, which potential is sufficient to enable the radar-intensity circuit to blank out the electron beam. The electron beam remains blanked out until the end of the sweep period, at which time an output pulse which is generated in the radar-timing or timer unit 20 is applied to the intensity-control unit 126, thereby deactivating this unit, which in turn results in the blanking potential being removed from the radar-intensity circuit 124. Thereby, the shaped-beam tube is enabled to display radar data at the instant that a new sweep period is started.

In view of the sweep slowdown required during the time a particular target and its associated identifying data is displayed, the present system may not display any information for the duration of that sweep. Stated in another manner, the present system may not display more than a single group of numerals or characters during a single sweep period and still maintain proper range scale. Accordingly, there is provided a sequential display control unit 128, which operates to permit only an individual display of targets with their associated groups of symbols, numerals, or characters, upon successive sweeps and in sequential order, depending upon the range of the target from the search radar. The sequential display control unit also prevents the display of more than one target and its associated data during each sweep period. A further function provided by this unit is to prevent the redisplay of a group of numerals and characters previously displayed, before a given number of sweep intervals have occurred. The number of sweep intervals permitted to elapse before a redisplay may occur is determined by the following considerations: (1) the expected maximum number of targets, of which it is desired to display associated code data in the form of numerals or characters, and which are of nearly the same azimuh with respect to the search radar, such that all of said targets are illuminated by the radar beams simultaneously: (2) characteristics of the radar, such as the antenna-beam width (beam width of radiated energy), antenna-scan rate (speed of antenna rotation), and pulse rate (the number of pulse radiations per second), all of which serve to determine the number of pulses of radio-frequency energy hitting at a target during a single scan of search-radar antenna.

This invention contemplates a lapse of ten sweep periods before permitting a redisplay of coded data from any given target aircraft. The lapse of ten periods will provide approximately two displays of coded data for each of ten targets, during a single scan (rotation) of the search antenna if the radar scans twice per minute and radiates approximately 400 pulses of radio-frequency energy per second. The invention is not so limited, however, for as will be readily apparent to those skilled in the art, the decision is largely determined by operating conditions, and the system is sufficiently flexible to accommodate a wide variety of conditions.

In order to operate the sequential-display control unit 128, there are applied thereto timing-output pulses from the intensity-control timer unit 120 and also sweep-voltage output from the sweep amplifier 28. In response to this input, the sequential-display control unit generates a unidirectional pulse potential which is applied to and serves to disable timing unit 90 at proper times such that targets and their associated codes are displayed singly on successive sweeps and in sequential order according to range from the search radar, the nearest target code signals being displayed on the first of a series of ten sweeps. Following the display of a maximum of ten code signal groups, or following the completion of ten sweep periods, if less than ten targets are present, sequential selector control unit 128 is reset in order to repeat the above-described display sequence. More specifically, the pulse output of the sequential-control unit serves (1) to activate timing unit 90 at the beginning of the first in a series of ten sweep periods, whereby code signals from the target nearest the search radar may be displayed, and (2) to deactivate timing unit 90 immediately after the first code group display is completed, whereby no other displays may occur during the remainder of the same sweep period, and (3) to hold timing unit 90 deactivated during the next following sweep period until the coded signals of the first display code group have again been received, and then (4) to immediately reactivate timing unit 90 so that the coded signals from the succeeding target in the range sequence may be displayed, and (5) to, immediately after this display of the second code group, deactivate the timing unit 90. The above procedure continues, each code group being displayed separately during separate sweep periods, until ten sweeps have been completed. If less than ten targets are available for display of associated coded data, during the allotted ten sweep periods, then timing unit 90 is continued to be activated during the remainder of each succeeding sweep period following the position of the last display upon the sweep. The manner in which the sequential-display control unit operates will be described subsequentially herein.

Figure 5 is a block schematic diagram of the various units within the pulse-code distributor 88 and some of the units in the selector-control unit 96. Figure 6 shows the remainder of the units in the selector-control unit. In Figure 2B, the input to the pulse-code distributor is received from the code amplifier 86. As shown in Figure 5, this input is applied to a flip-flop 130, which is included in the pulse-code distributor, and also to a one-shot multivibrator 132. The flip-flop circuit is the well-known two-stable-state type, which is set in response to the input and applies its output to a coupler or couple and reset circuit 134. The coupler and reset circuit is merely another flip-flop circuit, the output from which is applied to a timer amplifier or circuit 136 and also to reset flip-flop 130. The timer 136 is an astable multivibrator; in other words, it has no condition of stable equilibrium. It is maintained distabled by output from the coupler and reset flip-flop 134 until said coupler and reset circuit is driven. At this time, it is permitted to oscillate and provides an output comprising a symmetrical square wave.

Astable and bistable multivibrators are commonly used and well known to those who practice this art. Suitable circuits are shown in the book Waveforms, volume 19 of the Radiation Laboratories Series, published by the McGraw-Hill Book Company, sections 5.6, pages 171 through 173, and 5.4, pages 164 through 166.

A synchronizing oscillator 138 is employed to establish the frequency of oscillations that provides a desired data-transmission rate. A suitable reference frequency which may be employed is three megacycles per second. The output of the synchronizing oscillator 138 is injected into the timer unit 136 at any suitable electrode, so that when it is permitted to oscillate by the output from the coupler and reset circuit 134, it will oscillate at a desired frequency.

Accordingly, upon receiving an on-mark pulse, flip-flop 130 is switched to the set, or on, condition, and its output is applied by means of the coupler and reset circuit 134 to the timer unit 136, permitting the timer unit to oscillate and provide as its output a train of rectangular pulses. The synchronizing oscillator 138 provides crystal-controlled output to maintain the frequency of oscillation of the timer unit 136. The output of the timer unit is applied to an amplifier and driver unit 140, the output of which is employed to drive a counter 142.

It should be noted that when the counter 142 attains its last count state (7), the output at that time is applied to a one-shot multivibrator 144. The output of this one-shot multivibrator is employed to reset several different circuits, including the counter 142 and the "couple and reset" flip-flop 134. This insures that for each on-mark pulse applied to the flip-flop 130, counter 142 will be driven to count through a complete cycle, after which the input to the counter is turned off. As the counter counts through its two through six count states, it successively enables AND gates 146, 148, 150, 152, and 154. The output of the one-shot multivibrator 132 is applied as the second required input to all of these AND gates. It should be recalled at this point that this input will consist, first, of an on-mark pulse, followed by anywhere from zero to five pulses, which serve to specify the numeral or character to be displayed. Accordingly, the gates, which are successively enabled during the times within which the code pulses should successively occur, will transmit any outputs received from the one-shot multivibrator during the successive times of enablement. Expressed alternatively, when an on-mark pulse is received, counter 142 successively enables gates 146 through 154 thereafter during time intervals within which code pulses A through E should occur. The presence or absence of the code pulse during the occurrence interval is indicated by the presence or absence of an output from the successively enabled gates 146 through 154.

Each one of these gates has its output applied to set an associated flip-flop 156 through 164. The output of flip-flops 156 and 158, when in their set conditions, are applied to the vertical voltage adder 109; the outputs of flip-flops 160 through 164, when in their set conditions, are applied to the horizontal voltage adder 107. It should be recognized that the code which is received by means of the apparatus described, is established as a pattern of the presence or absence of voltage outputs of the flip-flops 156 through 164, which were previously designated by the letters A through E. A and B outputs are combined through an adding network to provide any one of four voltages for vertical deflection; outputs C, D, and E are combined by means of the horizontal adding network to provide any one of eight different voltages to provide a horizontal deflection of the electron beam. The output of the one-shot multivibrator 144 is employed to reset all the flip-flops 156 through 164 so that they are in condition to represent in parallel form the next code digit which is received.

One-shot multivibrator 132 actually operates as a pulse lengthener, extending the duration of each code pulse received to insure its occurrence at the proper interval established by the counter, yet not extending the pulse so long as to cause an incorrect operation of the gates or cause the pulse to extend over two counts. Gates of the type represented by rectangles 146 and 154 are found described in section 10.3, page 379, of the volume entitled Waveforms, of the Radiation Laboratory Series, published by McGraw-Hill Book Company, Inc. The one-shot multivibrator is described and shown also in the above-noted volume, Waveforms, on page 188, section 5.12. Suitable voltage adders of the type employed for the vertical and horizontal voltage addition are found described and shown in the above-entitled volume, Waveforms, Figure 8.6B, page 294. These circuits and their interconnections are all well known in the art, as shown above.

It was previously pointed out that when an on-mark pulse was received, an electron beam was deflected to a zero-zero position on the aperture mask, which served as a reference position for subsequent deflection when the code digit was converted to the proper deflection voltages. This function is carried out by a first and second flip-flop 170, 172, having respectively associated therewith first and second gates 174 and 176. The horizontal reference unit 110 (Figure 2B) will include the structure of the flip-flop 170 and gate 174 (Figure 5), and the vertical reference unit 108 (Figure 2B) will include the structure of the flip-flop 172 and the gate 176 (Figure 5). Upon the occurrence of the on-mark pulse, the output of the couple reset flip-flop 134 is applied to set flip-flops 170 and 172. Their outputs respectively enable gates 174 and 176, whereby voltages whose levels are set by means of a bias source 177, can be respectively applied to the horizontal deflectors and the vertical deflectors to establish the electron beam at the reference position. The bias source 177 may be a resistor connected across the power supply from which tap-off points to provide the desired bias values may be taken. As many tap-off points may be taken as there are bias voltages required. Flip-flops 170 and 172 remains set until the one-shot multivibrator 144 at the termination of the count by counter 142 provides an output for accomplishing their reset. This operates to terminate the reference voltage application at the termination of the display.

It was also previously indicated that upon receiving the on-mark signal, the electron beam was defocused for the purpose of insuring complete radiation of the character-shaped openings, and, further, the sweep speed receives a voltage, instructing it to slow down for the remainder of the sweep. The means for achieving these results are also obtained by using similar structure to that described. A flip-flop 180 has a gate 182 associated therewith. Upon receiving a set signal from the output of the "couple reset" flip-flop 134, flip-flop 180 is set, whereby the gate 182 can apply the voltage established from the bias source 177 to the focus circuit 122 to accomplish the focusing. A flip-flop 184 has associated therewith the gate 186. Upon receiving the set output of the "couple reset" flip-flop 134, the flip-flop 184 is set and applies its output to the gate 186, which can then apply to the sweep generator 26 a voltage derived from the bias source 177 to accomplish the purpose of slowing the sweep. Both flip-flops are reset subsequently to the display by the output of the intensity-control timer 126 in a manner to be described.

For the purpose of blanking out the beam of the shaped-beam tube, during the period required for the decoding of the incoming information, a flip-flop 188 is set in response to the set output of the "couple reset" flip-flop 134. The output of flip-flop 188, when set, is applied to a gate 190, which also derives a required bias potential from the bias source 177. The output of the gate is then applied to the radar-intensity circuit 124 which, in response thereto, blanks the beam of the shaped-beam tube. The flip-flop 188 is reset in response to the same output from the counter 142, which drives the one-shot multivibrator 144. It will be recalled that this is timed to occur just prior to the display on the face of the beam-shaped tube. Thus, the beam is blanked out until the proper decoding operation has occurred, at which time it is enabled to come on again to display the character which has been selected.

The output of the counter which drives one-shot multivibrator 144 is also applied to a flip-flop 192 to drive it from its reset to its set condition. At this time, the output of the flip-flop is applied to a gate 194, which is also biased from the bias source 177. The output of the gate is a voltage which is applied to the radar-intensity circuit 124 for the purpose of biasing it to intensify the cathode-ray beam. This intensification of the cathode-ray continues until the output of the one-shot multivibrator 144 is received, which serves to reset the flip-flop 192. Thus, at the instant that the blanking potential is removed from the radar intensity circuit, an intensifying potential is applied thereto. Upon completion of the display, the intensifying potential is removed.

Figure 6 is a block diagram of the remaining circuitry in the selector-control unit 96. The intensity-control timer unit 120 is a cyclic counter similar to counter 142, which, however, only has a five-count capacity before it starts its count over again. It is enabled to advance its count in response to outputs from the one-shot multivibrator 144 shown in Figure 5. When the counter has counted to five, its output is applied to reset the slow-sweep and focus-control flip-flops 180 and 184 in Figure 5, and also to set a flip-flop 196. The output of flip-flop 196, when in its set condition, enables a gate 198 to provide an output voltage, the level of which is set at the bias source 177, to the radar-intensity circuit 124. This voltage serves the function of instructing the radar-intensity circuit 124 in Figure 2A to blank the electron beam of the beam-shaped tube until the end of the sweep period. The end of the sweep period is indicated by an output from the timing-pulse generator 22 in Figure 2A, which serves to reset flip-flop 196. Accordingly, the intensity-control timer unit counts through five counts, each count advance being made each time a decoded character is being displaced. At the fifth count, flip-flop 196 is set. This results in the cathode-ray tube beam being blanked off until the end of the sweep, at which time flip-flop 196 is reset and the beam is turned on again.

There will next be described the sequential-display control unit 128, which, it will be recalled, serves to permit the display of a single group of five decoded numerals or characters per sweep, and to provide the means whereby said displays are made in sequential order, according to range of the associated target from the search radar. This unit includes a one-shot multivibrator 200, which is triggered when the intensity-control timer unit 120 reaches a count of five. The output of the one-shot multivibrator 200 is a short-duration pulse, which enables the gate 202 to pass therethrough a voltage C having an amplitude proportional to the sweep voltage received from the sweep waveform amplifier 28 (Figure 2A). The output of the gate 202 is a unidirectional voltage which is applied to an amplitude selector circuit 204.

The amplitude selector circuit 204 has three inputs. One of these is the output of the sweep waveform amplifier 28, the second is the output of the gate 202, and the third is a bias voltage from a bias amplifier or bias-reset circuit to be described. The amplitude selector 204 is actually a difference amplifier which operates to produce a single output pulse at the instant that the sweep waveform potential which is applied at one input thereto exceeds the value of the unidirectional potential (C) which is applied at the other input thereto. A suitable amplitude selection circuit is shown and described in the previously mentioned book Waveforms, in sections 9.2 through 9.7, pages 325 through 335, and, more specifically, in Figure 9.16 on page 340 of said book.

The output of the amplitude selector 204 (D) is a voltage, which is applied to a blocking oscillator 206, to cause it to emit a single large amplitude pulse. This blocking oscillator output is applied to a flip-flop 208, driving it to its set condition. The output of the flip-flop 208 is applied to a second flip-flop 210 to drive it to its set condition. The set output of the flip-flop 210 is applied to the flip-flop 130 to enable it to respond to any subsequently received on-mark pulse. In the absence of such enabling input, flip-flop 210 is biased to prevent it from responding to "on-mark" pulses.

Flip-flop 210 is reset each time an output is received from the fifth count state of the intensity-control timer unit, indicative of the fact that the five-character group has been displayed. Thereafter, flip-flop 130 cannot respond to any succeeding "on-mark" pulses until flip-flop 210 is set again.

The output of the sweep waveform amplifier 28 is also applied to a pulse circuit 212, which provides an output at the end of the sweep waveform. The method of producing a single-output pulse of short duration in time coincidence with the trailing edge of the sweep potential is well known. It involves a differentiating circuit, followed by a clipping circuit, followed by an amplifier. This circuit is shown and described in the aforesaid vol.

19 of the Radiation Laboratory Series, Figure 9.16, page 340. The output of the pulse amplifier 212 is applied to flip-flop 208 to drive it to its reset condition. The output of the flip-flop 208, when in its reset condition, resets flip-flop 210. This, as previously pointed out, prevents flip-flop 130 from responding to a thereafter received on-mark pulse until flip-flop 210 is again driven to its set condition. Thus, if after flip-flop 130 is enabled to respond to an "on-mark" pulse by the output of the flip-flop 210, no code signal pulses are received, at the end of the sweep period, flip-flop 210 is reset, and flip-flop 130 thereby is inhibited against responding to further on-mark pulses.

A cyclic counter 214, of the same type as those previously described, has a count capacity of 10. This counter is advanced each time an output is obtained from the pulse-output circuit 212. Thus, for every ten sweeps, the counter will count through one complete cycle of ten counts. A bias amplifier 216 receives the ninth-count output of the counter 214. In response thereto, it removes or negatives the effectiveness of the bias potential (C) which is applied to the amplitude selector from the gate 204. Actually, the bias amplifier 216 is a triode which is biased to be nonconductive except when the output of the ninth-count state of the counter is applied, at which time it is rendered conductive. When it is rendered conductive, it bypasses or removes the bias potential (C) from the input to the amplitude selector 204. This technique is a well-known one in this art.

Figure 7 is a wave shape diagram shown to assist in an understanding of the operation of the sequential-display control unit which has just been described. The input sweep potential A is shown, illustrating a series of ten sweep periods. During each sweep period, five on-mark pulses B, shown immediately below the sweep waveform, are received from five different targets distributed in range as indicated by the dots superimposed upon the sweep waveform A. Since at the start of the first sweep period, no bias potential (C) exists, the sweep potential A is amplified in the amplitude-selector circuit 204 (typical difference-amplifier operation in the absence of one of the inputs) at the start of the sweep period. A pulse which is the output of the amplitude selector 204 thus is generated at the start of the first sweep period, resulting in a substantially simultaneous triggering of the blocking-out oscillator to provide an output (D). This causes flip-flop 208 to be driven to its set condition, providing an output (H), which is applied to flip-flop 210, whereby it is driven to its set condition. The output of flip-flop 210, when in its set condition (H), is applied to flip-flop 130, which as a result is activated at the start of the first sweep.

After the first complete code group, consisting of five numerals or characters, has been displayed, the fifth-count condition output of the intensity-control timer unit 120, represented by the waveform E, is applied to reset flip-flop 210. The reset output potential F of flip-flop 210 is a positive pulse, the leading edge of which is coincident with the start of the sweep period, and the trailing edge of which is coincident with the end of the first code group displayed. Thus, flip-flop 130 is activated at the start of the first sweep period, and deactivated after display of the first code group is completed.

The fifth-count state output of the intensity-control timer unit E is also applied to the one-shot multivibrator 200, so that a sampling pulse of very short duration is produced and applied to the gate 202. Since this one-shot multivibrator output is substantially coincident with the output of the intensity-control timer unit, it, too, will be designated by the reference numeral E. In response thereto, gate 202 will provide an output voltage (C) equal to the amplitude of the sweep waveform potential at that time, which is at the end of the first code group displayed. The blocking oscillator will not be triggered to produce an output (D) until after the sweep waveform A exceeds the level of the voltage (C) at that time. Activation of the flip-flop circuit 130 is therefore delayed until after the time that code signals from the nearest target which were displayed during the first sweep period would have been received, at which time trigger circuit 130 is again activated by the output of flip-flop 210 (F) and remains activated until the output (E) of the intensity-control timer unit again inactivates flip-flop 130.

The sequenced operations described continues, bias potential C increasing in value for each display performed throughout the series of ten sweep periods. In the illustration, only five targets and five code group displays are shown in order to indicate how bias potential C remains constant following the last display of coded data and continues to delay the activation of the trigger circuit 130 during each of the remaining sweep periods such that the five displays cannot be repeated until the end of the ten-sweep period sequence. Upon generation of the ninth pulse potential, representing the end of the ninth-sweep period, the bias amplifier 216 has applied the output of the counter 214, whereby it is rendered conductive with an output as indicated by (J). This output is present until the tenth count is received by the counter. Thus, this tenth count, which occurs at the end of the tenth sweep period, again re-establishes the bias potential. This serves to again apply bias to reduce the bias C to zero.

Thus, control is maintained such that a single code group display per sweep period is performed. Displays are performed in order of succession according to range. If more than ten displays are desired, then counter 214 may be increased in capacity. While the invention has been described employing block diagrams, it is believed that the circuits represented by these blocks are so well known, as well as their co-operative interconnections, as not to require any further explanatory details.

There has accordingly been described and shown herein a novel and useful arrangement for presenting a radar display wherein targets are clearly identified by a character display associated with the target pip, if the target is properly equipped with a responsive transmitter.

I claim:

1. In a radar system of the type wherein in response to the transmission of a pulse there is received from an equipped target both a reflected pulse and a sequence of pulse-code groups each group representative of a character identifying said target, means for displaying said reflected pulse together with the associated characters comprising, in a radar receiver, target display means including a cathode-ray tube having in order electron-beam-generating means, beam-intensity-control means, beam-focus-control means, first deflecting means, a mask having a plurality of character-shaped apertures, an unshaped aperture and a reference location, second deflecting means, third deflecting means, and a screen, a target sweep generator having its ouput applied to said third deflecting means, means for separating a received reflected pulse from its associated pulse-code groups, first bias means coupled to said first and second deflecting means to deflect an electron beam through said unshaped aperture, means to apply said reflected pulse to said beam-intensity-control means to provide an indication of said target location on said screen, means responsive to a received pulse group to generate a set of reference deflection voltages, means for applying said reference deflection voltages to said first deflecting means for deflecting said electron beam to the reference location of said mask, means for generating from a code group a set of representative deflection voltages, said means including a first counter, means responsive to the first pulse of a pulse code group being received to drive said first counter through a complete counting cycle, a plurality of flip-flops, means responsive to said counter output to sequentially set or reset each of said plurality of flip-flops in accordance with whether or not a pulse in a code group is received at the time of said count, and means to sum the set outputs of selected ones of said flip-flops to provide a set of representative deflection voltages, means for applying said representative deflection voltages to said first and second deflecting means for directing the electron beam through the one of said character-shaped apertures which shapes said electron beam cross-section into the character represented by the code group and then redirects said electron beam toward the center of said cathode-ray tube, means responsive to said received pulse code groups to cause said target sweep generator to retard its sweep output for the duration of the sweep interval during which said pulse code groups were received, means responsive to said received pulse code groups to apply a voltage to said beam-focus control to defocus the electron beam while it is directed through a character-shaped aperture, means responsive to said received pulse code groups to apply a voltage to said beam-intensity-control means to intensify said electron beam while it is directed through a character-shaped aperture, means responsible to the characters identifying a target having been displayed to prevent response to other target pulse code groups during the remainder of said sweep interval, and means responsive to the characters identifying a target having been displayed to prevent a redisplay of said target-identifying characters until after up to a predetermined number of other target-identifying characters have been displayed, said last means comprising a second counter having a count capacity equal to the number of characters identifying a target, means for applying the output of the final count state of said first counter to advance said second counter count, means responsive to a final count output of said second counter to hold inoperative said means to drive said first counter through a cycle, and means responsive to the termination of each sweep interval to render said means responsive to the final count of said second counter inoperative.

2. In a radar system as recited in claim 1 wherein said means responsive to the characters identifying a target having been displayed to prevent a redisplay of said target-identifying characters until after a predetermined number of other target-identifying characters have been displayed includes a means for establishing a sweep bias level responsive to a final count output of said second counter equal to the amplitude of the output of said target sweep generator at that time, means to compare the output of said sweep bias level to the output of said target sweep generator to generate an output pulse when said target sweep generator is larger, means to apply said output pulse to said means responsive to the final count of said second counter to render it operative, a third counter, means to advance said third counter one count responsive to each sweep output from said target sweep generator, and means to reset said means for establishing said sweep bias level to an initial bias condition responsive to a final count output of said third counter.

References Cited in the file of this patent

UNITED STATES PATENTS

| | | |
|---|---|---|
| 2,581,358 | Busignies et al. | Jan. 8, 1952 |
| 2,622,240 | Fleming-Williams | Dec. 16, 1952 |
| 2,692,381 | Huber | Oct. 19, 1954 |

OTHER REFERENCES

"Cathode Ray Tube Displays," by Soller et al., M.I.T. Rad. Labs. Series, vol. 22, McGraw-Hill Book Co., 1948, pages 159–160, 230–237, 427.

"New Apparatus and Techniques of Air Traffic Control Data Handling and Display," by D. J. Anthony. IRE Convention Record, 1955, part 10, pages 55–61.

UNITED STATES PATENT OFFICE
CERTIFICATE OF CORRECTION

Patent No. 2,976,529                      March 21, 1961

Joseph T. McNaney

It is hereby certified that error appears in the above numbered patent requiring correction and that the said Letters Patent should read as corrected below.

Column 1, line 35, for "signal" read -- signals --; column 5, line 61, for "electrostaic" read -- electrostatic --; column 8, line 43, for "azimuh" read -- azimuth --; column 9, line 29, for "subsequentially" read -- subsequently --; column 11, line 15, for "remains" read -- remain --; column 15, line 19, for "responsible" read -- responsive --.

Signed and sealed this 12th day of September 1961.

(SEAL)
Attest:

ERNEST W. SWIDER
Attesting Officer

DAVID L. LADD
Commissioner of Patents

USCOMM-DC